United States Patent
Banerjee et al.

(10) Patent No.: US 11,151,365 B2
(45) Date of Patent: Oct. 19, 2021

(54) PEOPLE DETECTION SYSTEM WITH FEATURE SPACE ENHANCEMENT

(71) Applicant: Capillary Technologies International Pte Ltd, Singapore (SG)

(72) Inventors: Sumandeep Banerjee, Karnataka (IN); Subrat Panda, Karnataka (IN); Doney Alex, Karnataka (IN)

(73) Assignee: Capillary Technologies International PTE LTD, Singapore (SG)

( * ) Notice: Subject to any disclaimer, the term of this patent is extended or adjusted under 35 U.S.C. 154(b) by 108 days.

(21) Appl. No.: 16/436,008

(22) Filed: Jun. 10, 2019

(65) Prior Publication Data
US 2019/0377940 A1    Dec. 12, 2019

(30) Foreign Application Priority Data
Jun. 12, 2018 (IN) .............................. 201841021909

(51) Int. Cl.
*G06K 9/00* (2006.01)
*G06K 9/62* (2006.01)
*G06K 9/34* (2006.01)

(52) U.S. Cl.
CPC ..... *G06K 9/00362* (2013.01); *G06K 9/00718* (2013.01); *G06K 9/00744* (2013.01);
(Continued)

(58) Field of Classification Search
CPC ........... G06K 9/00362; G06K 9/00718; G06K 9/00744; G06K 9/00778; G06K 9/346; G06K 9/6256
See application file for complete search history.

(56) References Cited

U.S. PATENT DOCUMENTS 10,332,261 B1 * 6/2019 Farivar .................. G06N 3/088
2009/0097711 A1 * 4/2009 Chen .................. G06K 9/00375
382/103
(Continued)

OTHER PUBLICATIONS

Scale-invariant feature transform [online], Wikipedia, 2020 [retrieved on Oct. 9, 200], Retrieved from the Internet: <URL: https://en.wikipedia.org/wiki/Scale-invariant_feature_transform> , 20 pages (Year: 2020).*

*Primary Examiner* — David F Dunphy
(74) *Attorney, Agent, or Firm* — BakerHostetler

(57) ABSTRACT

A people detection system with feature space enhancement is provided. The system includes a memory having computer-readable instructions stored therein. The system includes a processor configured to access a plurality of video frames captured using one or more overhead video cameras installed in a space and to extract one or more raw images of the space from the plurality of video frames. The processor is further configured to process the one or more raw images to generate a plurality of positive image samples and a plurality of negative image samples. The positive image samples include images having one or more persons present within the space and the negative image samples comprise images without the persons. The processor is configured to apply at least one of a crop factor and a resize factor to the positive and the negative image samples to generate curated positive and negative image samples and to detect one or more persons present in the space using a detection model trained by the curated positive and negative image samples.

19 Claims, 6 Drawing Sheets

(52) U.S. Cl.
CPC ......... *G06K 9/00778* (2013.01); *G06K 9/346* (2013.01); *G06K 9/6256* (2013.01)

(56) References Cited

U.S. PATENT DOCUMENTS

2018/0253596 A1* 9/2018 Barman ............. G06K 9/00369
2019/0335077 A1* 10/2019 Rieveschl .......... H04N 5/23212

* cited by examiner

PEOPLE DETECTION SYSTEM WITH FEATURE SPACE ENHANCEMENT

PRIORITY STATEMENT

The present application hereby claims priority to Indian patent application number 201841021909 filed on 12 Jun. 2018, the entire contents of which are hereby incorporated herein by reference.

FIELD

The present invention relates to a system and method for object detection and, more particularly, to techniques relating to people detection, using images from overhead video feeds.

BACKGROUND

Object detection techniques are used for identifying a specific object from a digital image or a video. Most of the current object detection systems rely on matching, learning or pattern detection algorithms using appearance based or feature based techniques.

Currently a variety of algorithms are being used for people detection. The existing algorithms solve the pedestrian detection problem where people are detected from a near horizontal view. Detecting people from a top view is a challenge compared to pedestrian detection as the amount of information available is limited in top view compared to a horizontal view. Also, there is a lot of rotational variation of data from top view, along with almost no unique discernible shape. Further, multiple people in the same frame can lead to challenging problems such as separation of humans close to each other. In this context, robust people detection and separation becomes an extremely difficult task especially in a crowded scene.

Moreover, illumination changes across scenes may also hinder the detection, especially for conventional background subtraction based methods. The advantage of top view detection especially in cluttered environments is little occlusion and less variations in size with a fixed height of installation of camera.

Most of the people detection algorithms typically solve the pedestrian detection problem. However, for applications that requires tracking, this may fail because of possible occlusion and variations in size of the person with the variation of distance from the camera. One way of detection is frontal (horizontal view) detection based on HOG-SVM based classifier. The HOG-SVM works well on pedestrian detection but for a top view detection the amount of information available from overhead view is very less as there is only a circular blob of head which is visible and hence the gradient information is very limited. Along with the head, partial face is also visible at some angles, but it is not sufficient to extract and work on facial features. Besides, the face is visible for a very short duration in the frame for a moving person.

Recently, deep learning methods have shown to achieve significant improvement in detections compared to the conventional methods. Many existing CNN networks dedicated hardware can run deep learning networks do perform detections. These networks can be retrained to solve top view people detection with better accuracy. However, the computational requirement for such systems is high and may not be able run in real time on a light embedded platform.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide an overhead people detection and tracking system.

Briefly, according to an example embodiment, a people detection system with feature space enhancement is provided. The system includes a memory having computer-readable instructions stored therein. The system includes a processor configured to access a plurality of video frames captured using one or more overhead video cameras installed in a space and to extract one or more raw images of the space from the plurality of video frames. The processor is further configured to process the one or more raw images to generate a plurality of positive image samples and a plurality of negative image samples. The positive image samples include images having one or more persons present within the space and the negative image samples comprise images without the persons. The processor is configured to apply at least one of a crop factor and a resize factor to the positive and the negative image samples to generate curated positive and negative image samples and to detect one or more persons present in the space using a detection model trained by the curated positive and negative image samples.

According to another example embodiment, a people detection system with feature enhancement is provided. The system includes a plurality of overhead video cameras installed within a space. Each of the plurality of overhead video cameras is configured to capture real-time video of the space. The system also includes a detector communicatively coupled to the plurality of overhead video cameras and configured to detect one or more persons present in the space. The detector includes an image processing module configured to process video frames of the captured video to generate a plurality of positive image samples and a plurality of negative image samples. The positive image samples comprise images having one or more persons present within the space and the negative image samples comprise images without the persons. The detector also includes a feature space estimation module configured to determine one or more feature space parameters. The feature space parameters include a crop factor, a resize factor, or combinations thereof. The detector includes a detector module configured to apply the one or more feature space parameters to the positive and the negative image samples to generate curated positive and negative image samples and to detect one or more persons present in the space using a detection model trained by the curated positive and negative image samples.

According to yet another embodiment, a method for detecting persons in a space is provided. The method includes accessing a plurality of video frames captured using one or more overhead video cameras installed in a space, extracting one or more raw images of the space from the plurality of video frames and processing the one or more raw images to generate a plurality of positive image samples and a plurality of negative image samples. The positive image samples include images having one or more persons present within the space and the negative image samples include images without the persons. The method also includes applying at least one of a crop factor and a resize factor to the positive and the negative image samples to generate curated positive and negative image samples and detecting one or more persons present in the space using a detection model trained by the curated positive and negative image samples.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
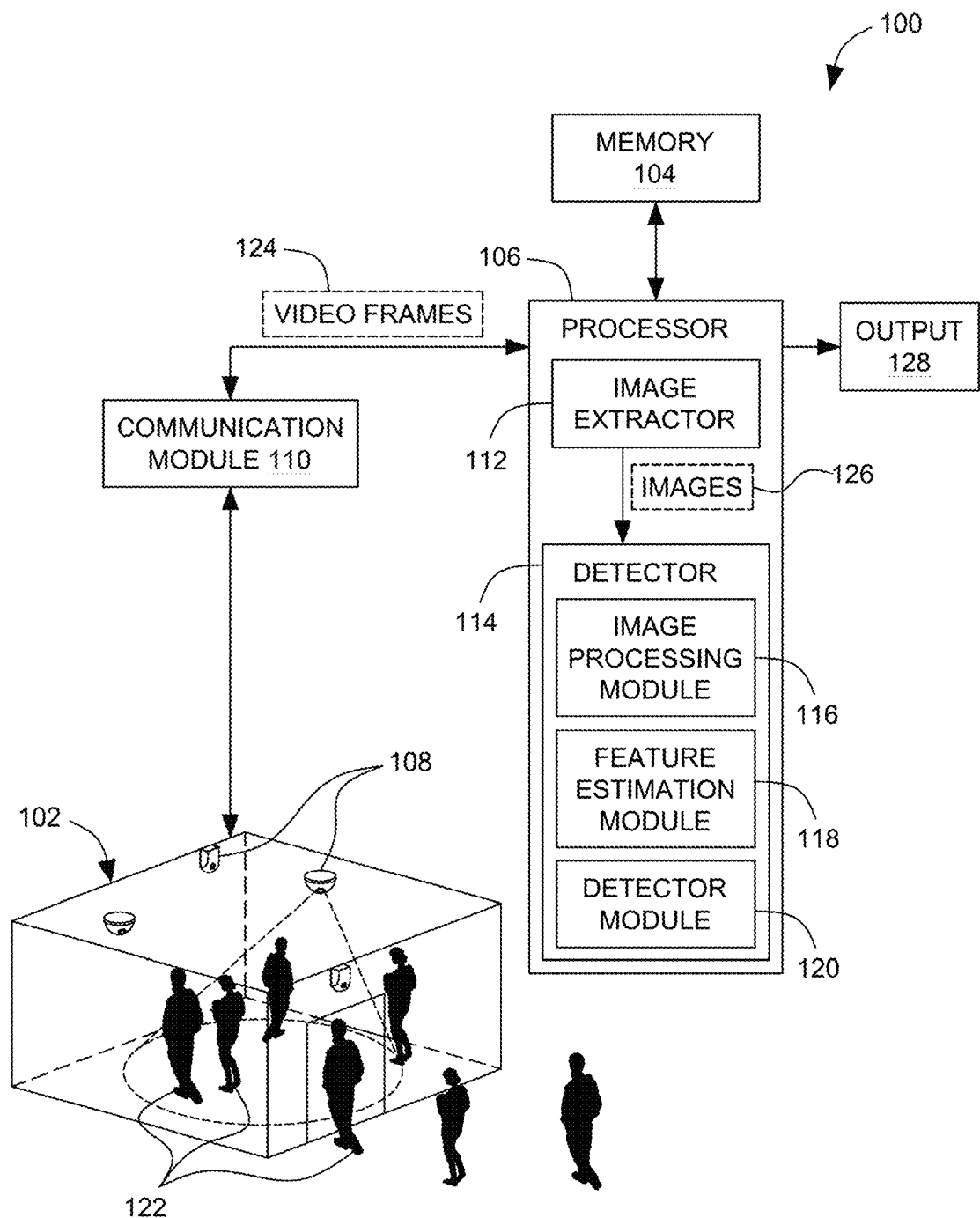
FIG. 1 illustrates an example overhead people detection and tracking system for top view people detection and counting in a space, implemented according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below", or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Embodiments of the present invention are generally directed to a people detection system and method relating to people detection using images from overhead video feeds. In particular, the present techniques enable feature space enhancement for accurate people detection in spaces such as a retail store. It should be noted that though the description provided here is particularly for people detection in spaces, the techniques may be used for detection of other objects.

FIG. 1 illustrates an example overhead people detection and tracking system 100 for top view people detection and counting in a space 102, implemented according to the aspects of the present technique. The overhead people detection and tracking system 100 includes a memory 104, a processor 106 and a plurality of overhead video cameras 108 installed within the space 102. As will be appreciated by one skilled in the art the overhead people detection and tracking system 100 may be used for people detection and counting in a variety of spaces such as a retail store, a hospital, a commercial establishment, among others. Each of the plurality of overhead video cameras 108 is configured to capture real-time videos at a pre-determined resolution corresponding to pre-determined detection scales.

Moreover, a communication module 110 is coupled to the processor 106. The communication module 110 is configured to access a plurality of video frames such as generally represented by reference numeral 120 captured using the one or more overhead video cameras 108 installed in the space 102 and to transmit the video frames 120 for further processing by the processor 106. In some examples, the video frames 120 may be stored in the memory 104 and the processor 106 is configured to access the video frames 120 from the memory 104. In the illustrated embodiment, the processor 106 includes an image extractor 112 and a detector 114. The detector 114 includes an image processing module 116, a feature space estimation module 118 and a detector module 120.

In operation, the system 100 is configured to detect presence of one or more persons generally represented by reference numeral 122 as they enter, exit and/or navigate in the space 102. In the illustrated embodiment, the one or more overhead video cameras 108 may be located at various locations within the space 102. For example, an overhead camera 108 may be located adjacent to an entry point of the space 102 and is configured to capture real-time video feed of the one or more persons 122 entering or exiting the space 102. Similarly, the plurality of overhead cameras 108 may be placed at different locations of the space 102. Each component is described in detail below.

The processor 106 includes an image extractor 112 and a detector 114. The detector 114 includes the image processing module 116, feature space estimation module 118 and the detector module 120 that may be coupled via a bus or other link, although other numbers and types of systems, devices, components, and elements in other configurations can be used. The image extractor 112 is configured to extract one or more images 124 of the space 102 from the plurality of video frames 120.

The image processing module 116 is configured to process the acquired images 124 to facilitate curation of the images to generate training samples used for detection of people. In this example, the image processing module 116 is configured to process video frames of the captured video to generate a plurality of positive image samples and a plurality of negative image samples. As used herein, the term "positive image samples" refers to images having one or more persons present within the space and the term "negative image samples" refers to images without the persons. It should be noted that the image processing module 116 may collect the sample images prior to the deployment of the people detection system 100. Such sample images may be used for training of the model used for detection of people in the space.

In one example, the image processing module 116 is configured to annotate the images 124 to identify one or more persons in the images 124. Moreover, image processing module 116 is configured to extract annotated portions of images 124 and to rotate the extracted portions at a plurality of rotation angles to generate rotated image samples. The rotated image samples are then combined with a plurality of backgrounds to generate the plurality of positive image samples. In some examples, the image processing module 116 is configured to utilize pyramid blending for generating the positive image samples. Advantageously, pyramid blending substantially minimizes effects of boundary artifacts in the image samples.

In another embodiment, the image processing module 116 is configured to generate a plurality of sub-images using the negative image samples and select sub-images having a resolution substantially similar to resolution of the positive image samples to generate the plurality of negative image samples.

In addition, the feature space estimation module 118 is configured to optimize the feature space for the training samples. In this embodiment, the feature space estimation module 118 is configured to determine one or more feature space parameters. Examples of the feature space parameters comprise a crop factor, a resize factor, or combinations thereof. In one example, the feature space estimation module 118 is configured to determine the resize factor to obtain a desired detection accuracy at a pre-determined frame rate.

Moreover, the detector module 120 is configured to apply the one or more feature space parameters to the positive and the negative image samples to generate curated positive and negative image samples and to detect one or more persons present in the space using the curated positive and negative image samples. In one example, the feature space estimation module 118 is configured to determine the crop factor to prevent detection of two persons present in close proximity to be detected as one person. Moreover, the detector module 120 is configured to crop the image samples in accordance with the crop factor. In this example, the feature space estimation module 118 is configured to select the crop factor to remove portions corresponding to shoulders of the two persons present in close proximity.

In some embodiments, the detector module 120 is configured to iteratively train a detection model using the feature vectors corresponding to the curated positive and negative image samples. The detection model may implement a plurality of classifiers. In one example, the detector module 120 is configured to utilize a set of weak classifiers to separate the negative image samples based on a pre-determined set of boundaries.

The detector module 120 is further configured to perform negative sample mining using the partially trained model and if required adjust the crop factor and/or resize factor accordingly. In one example, the detection model comprises an AdaBoost classifier for classification and detection of one or more persons present in the space. In one example, the detection model is further configured to estimate a detection accuracy and a classification accuracy of the model. Further, the people detection system 100 comprises an output module 128 configured to display output metrics regarding detected people in the space 102 along with other metrics such as a detection accuracy and classification accuracy.

Figure 2:
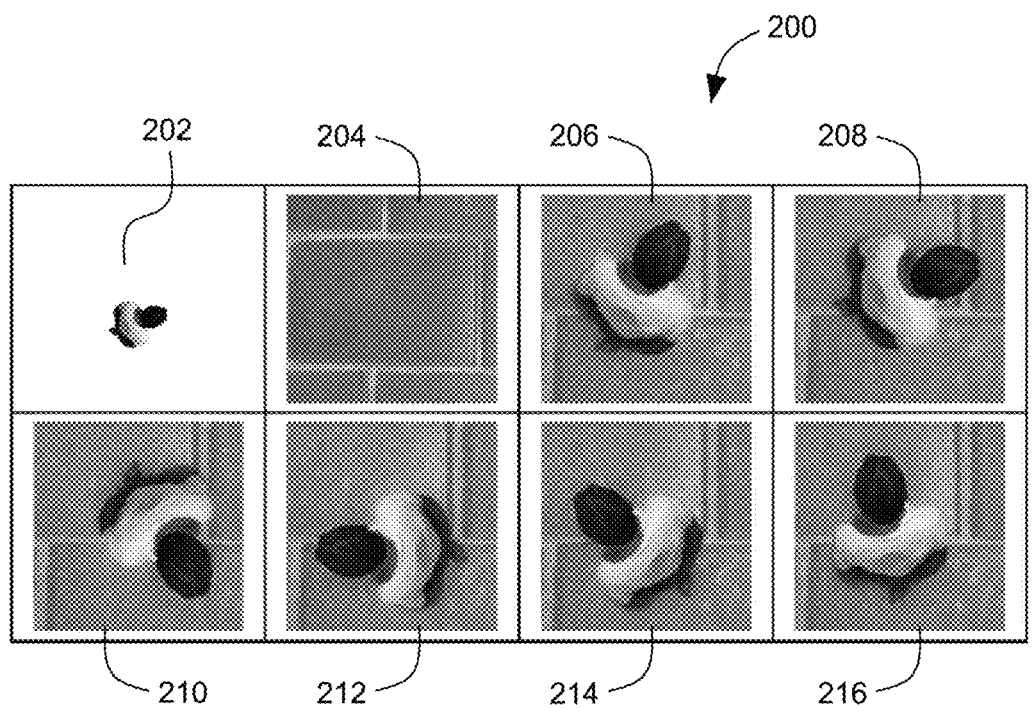
FIG. 2 illustrates generation of positive image samples using the image processing module of the system of FIG. 1.

As described above, the image processing module 116 is configured to process the acquired images 124 to facilitate curation of the images to generate training samples used for detection of people. FIG. 2 illustrates generation of positive image samples 200 using the image processing module 116 of the system 100 of FIG. 1.

In the illustrated embodiment, the image processing module 116 is configured to facilitate generation and augmentation of image samples using the raw images 124. In this example, the image processing module 116 is configured to curate the samples with binary annotation, with foreground pixels opaque and background pixels transparent, as represented by image 202. As can be seen, the sample images such as image 202 may contain one or more people that may be duly annotated by rectangles marking their location.

Moreover, the image processing module 116 is configured to provide rotational invariance to generate a set of rotated samples by extracting the annotated rectangle and performing planar rotation at a number of angles such as about 8 to 12 variations covering the complete 360 degrees. In addition, the image processing module 116 is configured to combine the rotated samples with a set of random backgrounds such as represented by image 204 to maintain statistical robustness. In the illustrated embodiment, images 206 to 216 represent images with foreground blended to the background 204 in different angles.

In certain examples, to further improve generality, the image processing module 116 may utilize a large number of backgrounds but randomly choose a much smaller subset of them for each of the sample positive images. In this example, pyramid blending is utilized to minimize the effect of boundary artifacts at the edge of foreground and background such as illustrated in images 200. Moreover, the opaque foreground is combined with pixels of the background from the transparent pixel regions of the samples.

As will be appreciated by one skilled in the art, the image processing module 116 is configured to synthetically generate a substantially large number of positive training samples from a relatively smaller set using the process described above. Moreover, the present technique facilitates generation of images that capture a large range of environment and orientation variations, that otherwise would be extremely cumbersome to create. The generated positive image samples also cover variation of clothing, hair color and other relevant parameters.

In addition, the image processing module 116 is configured to generate a plurality of negative image samples. In this example, a large set of images of environments are acquired where the system 100 is expected to be deployed. Further, the image processing module 116 is configured to select the images which do not contain any part of people to be detected.

Moreover, the image processing module 116 performs random sample generation from this set of selected images. In operation, image pyramids are created out of each selected negative image, and at each scale, a number of sub-images having substantially same image resolution as the positive image samples are randomly selected with a given probability. As a result, a large set of negative sample images covering a varied range of negative backgrounds are generated that are also robust to scale/size variations.

The image processing module is further configured to extract a plurality of channel features using the positive and the negative image samples described above. The channel features are extracted from each generated image sample. In this example, channels such as L, U, V, gradient, magnitude, histogram of gradients along angles 0°, 30°, 60°, 90°, 120° and 150° are selected. In operation, for each image sample at image resolution W×H about N channels with a sub-sample factor k are computed. In this example, the number of features generated ($F_n$) is estimated in accordance with the following relationship:

$$F_n = \frac{WHN}{k^2} \qquad \text{Equation 1}$$

Moreover, the features are flattened into a vector of the dimension $F_n$.

As discussed with reference to FIG. 1, the feature space estimation module 118 is configured to determine one or more feature space parameters. In this embodiment, the feature space parameters comprise at least one of a crop factor and a resize factor. In this embodiment, a subset of image samples are selected for feature extraction to determine the optimal feature space. Such samples are generated at a relatively higher resolution and are cropped/resized to enhance detection quality.

The cropping factor may be applied to the positive and negative image samples to prevent detection of people present in close proximity in the space. In operation, the one or more overhead video cameras 108 are configured to capture videos from an overhead view of the space. Here, from the overhead view, only top of the head and shoulders of the persons present in the space are visible. To detect people from such views, the detection model of the system 100 is trained with annotating the complete person as visible from the top. Moreover, a cropping factor is estimated to enhance detection quality for spaces having multiple people in proximity. The technique resolves the issue of merging of detected rectangles during Non-Maxima Suppression (NMS) step of detection technique.

Figure 3:
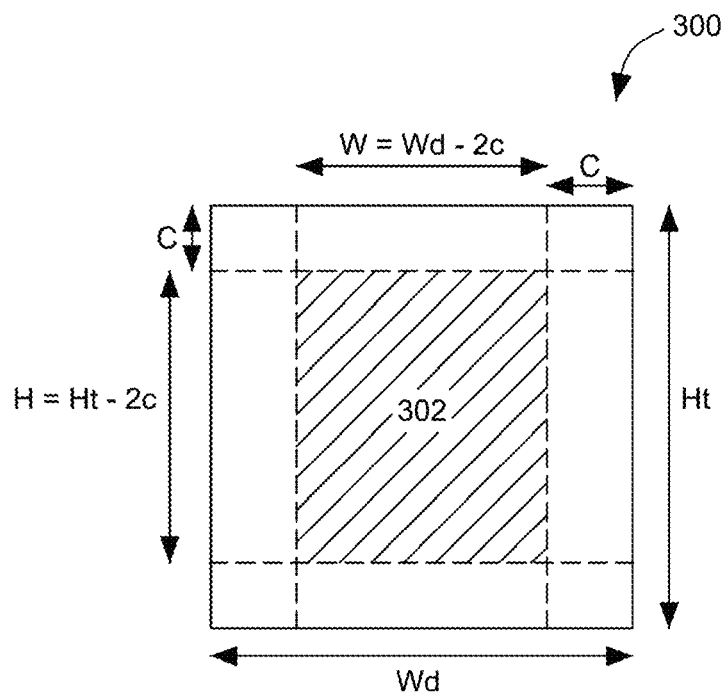
FIG. 3 illustrates an image sample cropped by the feature estimation module of the system of FIG. 1 to generate a curated image sample.

FIG. 3 illustrates an image sample cropped by the feature estimation module 118 of the system 100 of FIG. 1 to generate a curated image sample. Here, the image 300 is cropped in accordance with a cropping factor by the feature estimation module 118. In operation, for each of positive and negative sample images such as image 300 having size $W_d \times H_t$ generated by the image processing module 116, the feature estimation module 118 selects a center part 302 of the sample image (with size W×H) to generate the curated image sample. Depending on the crop factor, the feature estimation module 118 removes a part or whole of the shoulders of one or more persons from the sample, retaining only the top view of the head. The cropping of the image facilitates accurate detection of persons. The detector module starts 120 thereby detects and marks only the head portion of the person thereby reducing or eliminating the overlap between detections of two persons in close proximity. The feature estimation module 118 is configured to determine the optimal cropping factor to enhance the detection quality.

Figure 4:
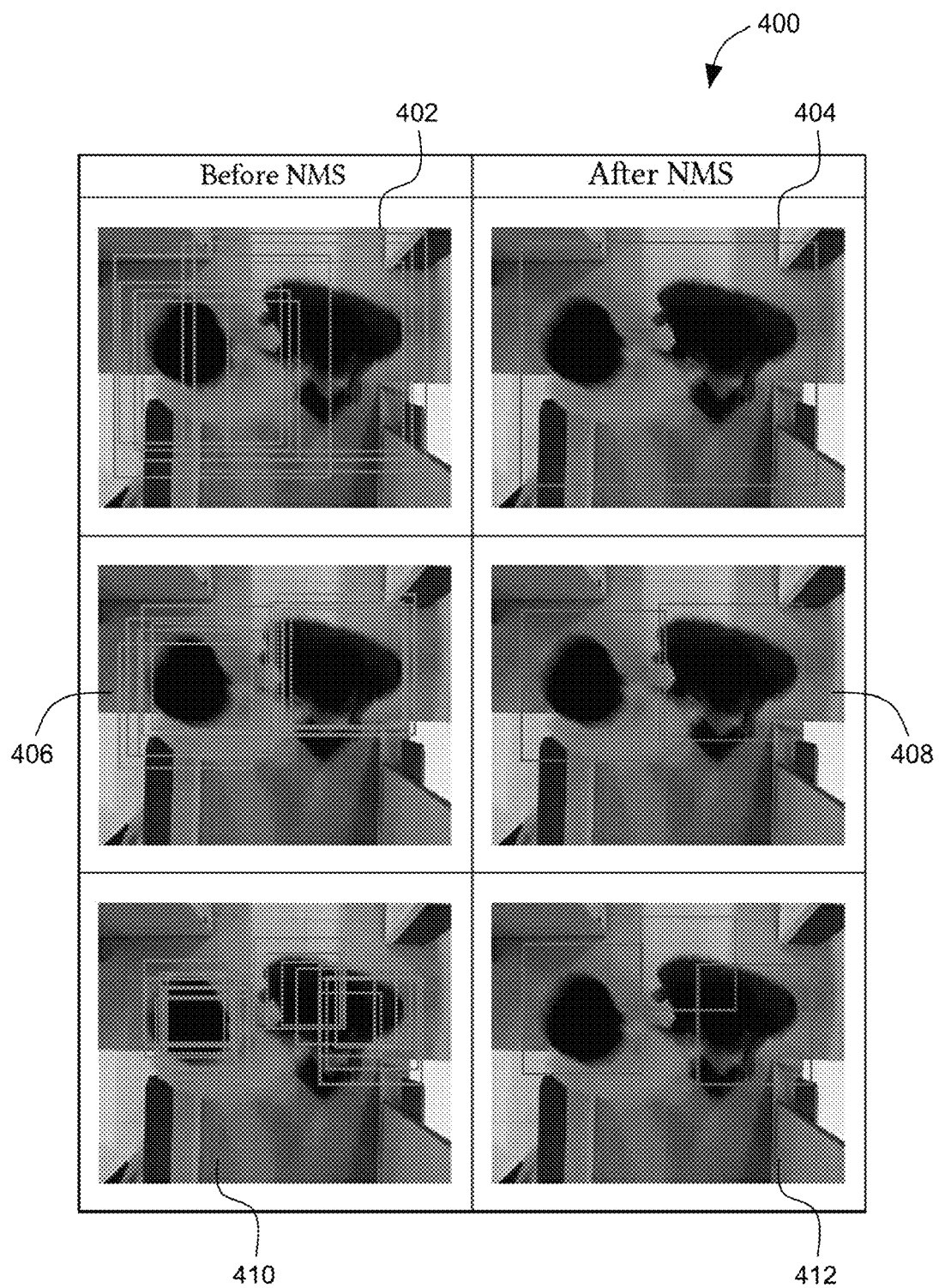
FIG. 4 illustrates sample images before and after Non-Maxima suppression (NMS) using the cropping factors.

FIG. 4 illustrates sample images 400 before and after non-maxima suppression (NMS) using the cropping factors. In this embodiment, images 402 and 404 are images before and after NMS. The cropping factor for these images 402 and 404 is set to zero and the images have not been cropped. As can be seen, in the image 404, NMS merges the two rectangles into one thereby leading to incorrect detection of persons. Further, images 406 and 408 are images before and after NMS with a cropping factor of 12. In addition, images 410 and 412 are images before and after NMS with a cropping factor of 24. As can be seen, the cropping removes part or whole of the shoulder portion thereby reducing or eliminating the overlap between detections of two persons in close proximity thereby enhancing the detection quality.

It should be noted that substantial cropping of the images may lead to an increase in the rate of false positive detections by the detector module 120. Alternately, less or no cropping may lead to bad object localization as can be seen in images 400 of FIG. 4. In this example, the system 100 is configured to utilize data driven approach to determine an optimal cropping factor for the positive and negative image samples.

The feature estimation module 118 is further configured to determine a resize factor (S) for each of the sample images. The feature estimation module 118 is configured to select the resize factor for feature space extraction. In this example, the effective size of the sample is determined in accordance with the following relationship:

$$\text{Sample size} = W/S \times H/S \qquad \text{Equation (2)}$$

The cropped positive and negative image samples may be resized while training of the detection model. In one example, sliding is done in default steps for detection, but the samples fed for feature generation may be sub-sampled. In an example embodiment, for large values of S, the computation time required by the detector is less owing to less number of features to compute. However, this may lead to poor detection due to increase in false detections. In an alternate embodiment, by reducing the value of S, the detector has a better detection accuracy. In such scenario, the computation time of the computing platform may increase substantially. The feature estimation module 118 is configured to determine a suitable sample size that gives desired detection accuracy at an optimal frame rate.

As discussed before, the detector module 120 is configured to iteratively train a detection model using the feature vectors corresponding to the curated positive and negative image samples generated as described below. The detection model includes a plurality of classifiers and is configured to perform negative sample mining using the partially trained model.

In the illustrated embodiment, the detector module 120 is configured to implement multi-staged training of AdaBoost classifier for object classification. In this example, the algorithm is based on training a set of weak classifiers applied in sequence order to incrementally weed out the negative image samples based on different decision boundaries, while preserving the positive image samples. In operation, a first set of classifiers reject substantially less number of negative image samples, while passing almost all the positive image samples. Further, subsequent weak classifiers use a preset criteria to remove the negative image samples that have passed through earlier weak classifiers, while maintaining the clearance rate of positive samples. In some examples, each classifier is a depth limited decision tree, with nodes based on different features picked for maximal separation boundary of positive and negative image samples.

Figure 5:
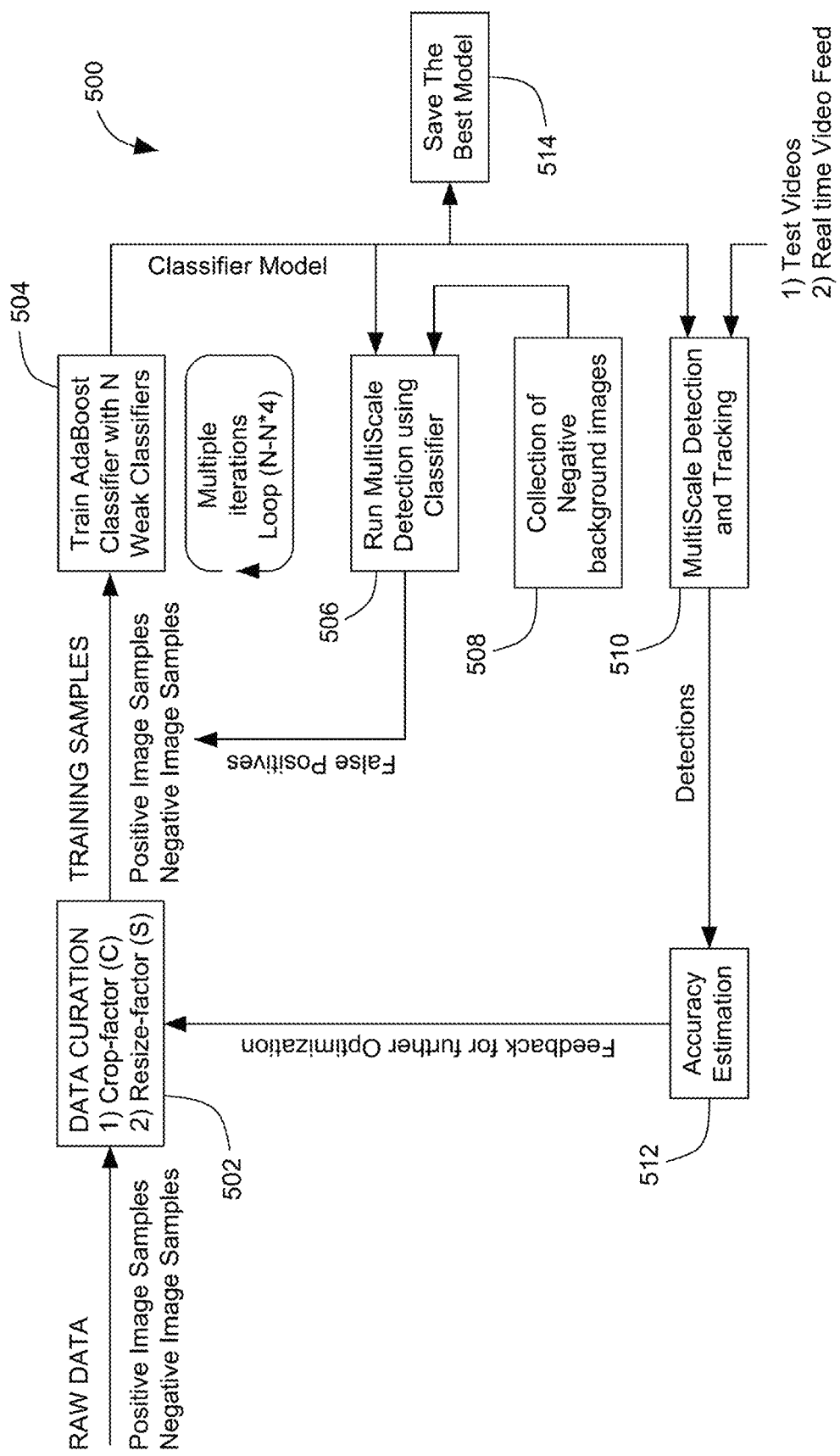
FIG. 5 an example process for training of the detection model.
Figure 6:
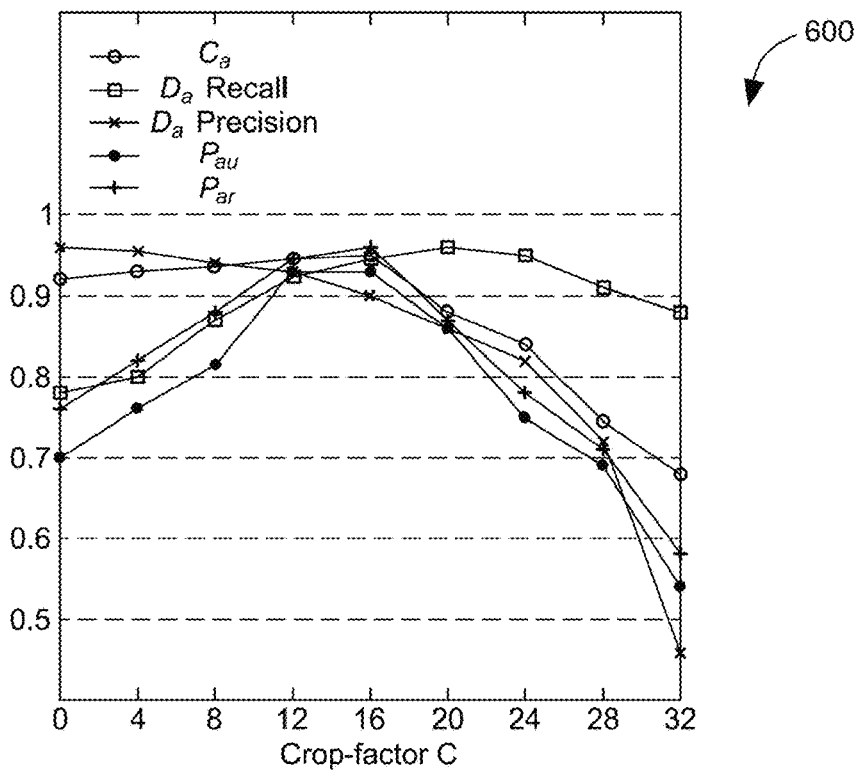
FIG. 6 is a graphical representation of classification accuracy, detection accuracy (precision and recall) and counting accuracy of the system relative to the cropping factor.

FIG. 5 illustrates an example process 500 for training of the detection model. As illustrated, raw data including the positive and negative image samples are received by the image processing module 116. At block 502, data curation of the positive and negative image samples is performed by the image processing module 116. As described before, the crop factor and the resize factors may be determined by the feature estimation module 118 and the images may be cropped and/or resized accordingly to generate the training samples which are used to train AdaBoost classifier with a number of weak classifiers (block 504). Moreover, multi-scale detection is performed using the classifier (block 506) and false positives are added to the training samples as negative image samples.

After training classifiers of one stage, it is used to identify false detections in this collection of negative background images (block 508). If any detections are found they are most definitely false, the sub-images corresponding to the rectangular blocks are added to the negative sample set for the training model to learn. In this example, after each round of negative sample mining, the number of classifiers is increased, and the next stage is trained.

Further, multi stage detection is performed using the model and the detections are used for accuracy estimation (blocks 510 and 512). In this example, test videos and real time video feed is provided to the detector module. Further, feedback from the estimated accuracy is provided for further optimization of the feature parameters like the crop and resize factor. The optimized model is saved for further detections (block 514).

In this example, the classifier determines the image samples as positive with a confidence value that can vary from negative to positive. Moreover, true negatives give negative confidence value, false positives are low positive values, and true positives give a relatively higher positive value. In this embodiment, hard negative mining is used to push the effective confidence threshold closer to zero irrespective of usage situation thereby facilitating the detection to be substantially generic and robust.

Figure 7:
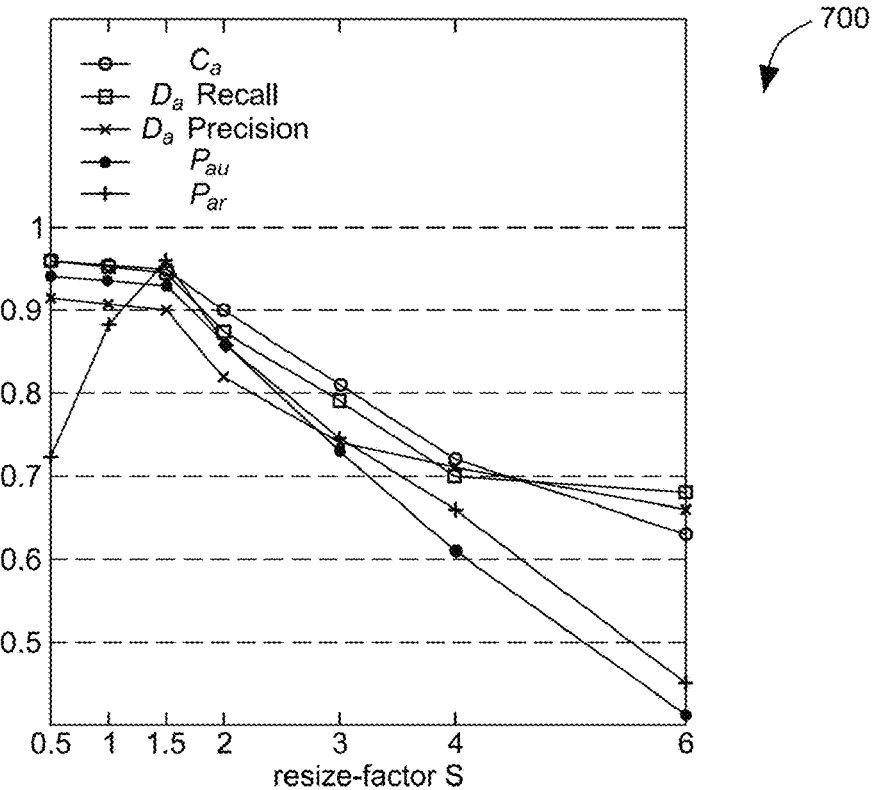
FIG. 7 is a graphical representation of accuracies with respect to a resize factor.
Figure 8:
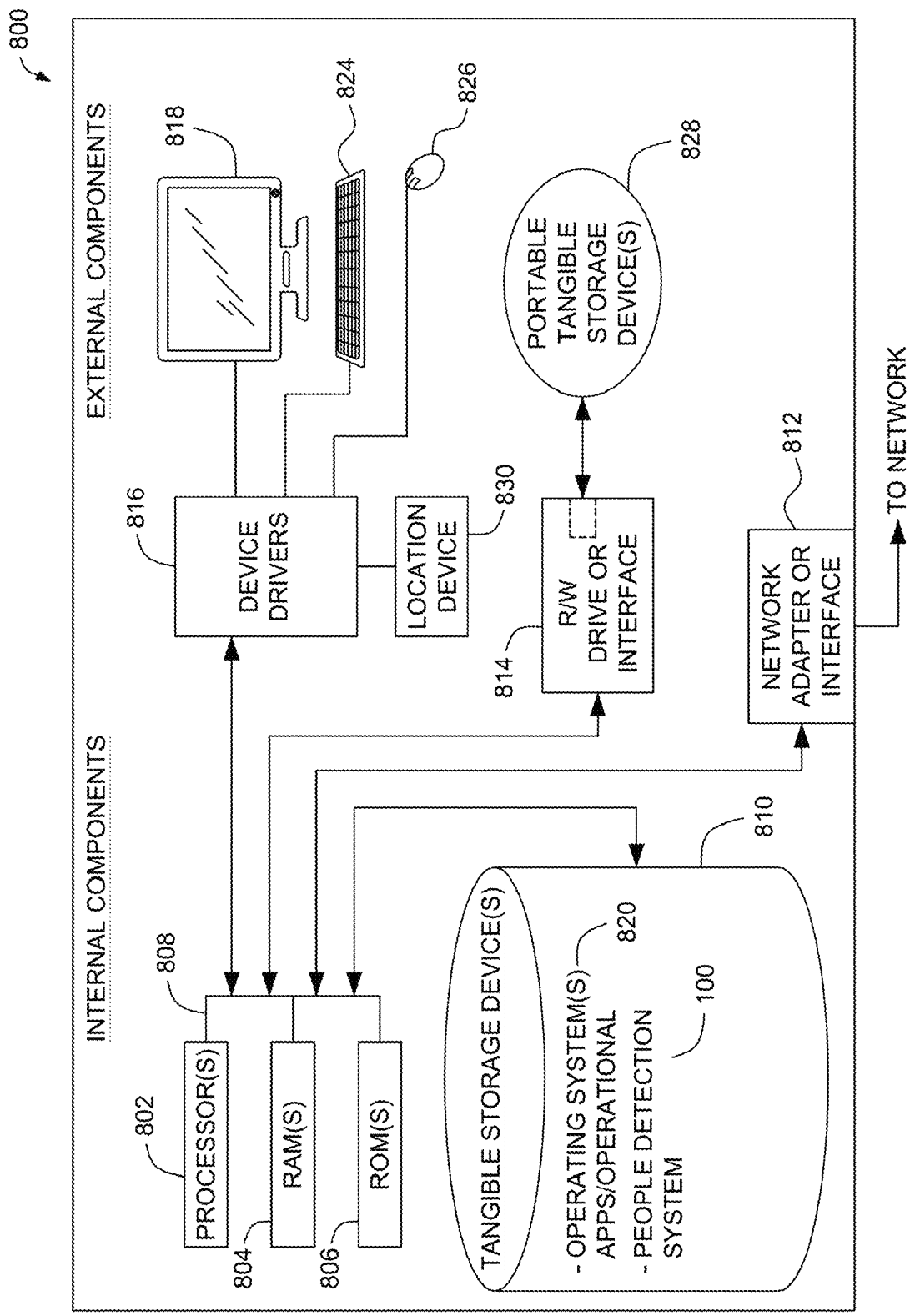
FIG. 8 is a block diagram of an embodiment of a computing device in which the modules of the people detection system, described herein, are implemented.

FIG. 7 is a graphical representation 600 of classification accuracy, detection accuracy and counting accuracy of the system 100 relative to the cropping factor. In this example, videos were recorded of people walking in multiple directions from top view from various heights ranging between about 8 feet to 11 feet. The videos were recorded at constant frame rate of about 20 frames per second (fps). Here, metrics such as classification accuracy ($C_a$), detection accuracy ($D_a$) and counting accuracy ($P_a$) were evaluated. The classification is the accuracy of the trained AdaBoost binary classifier. Here, artificially generated samples were used during training, and for evaluating Ca, annotated samples from true images obtained from the recorded videos were used. The classification accuracy ($C_a$) is defined in accordance with the following relationship:

$$C_a = \frac{T_P + T_N}{P + N} \quad \text{Equation (3)}$$

Where: $T_P$ and $T_N$ represent number of true Positives and true negatives respectively; and P and N represent total number of positives and negatives.

For estimating the detection accuracy (Da), the trained classifier as detector is integrated by scanning window at different scales. The number of scales is set to about 4 and step in sliding is kept as 1. Moreover, the detection accuracy is evaluated using annotated images. In this example, the detector was integrated to a tracker (Kalman filter with Hungarian assignment). Here, the detector was configured to count the number of people going in and out of a space. One direction was defined as 'In' and its opposite was defined as 'Out' and adjacent sides were split equally. Further, the direction of the person was decided based on which direction he came into the frame and the direction he went out.

Here, two Counting accuracies were evaluated, using the recorded videos ($P_{av}$) and another using real time video feed ($P_{ar}$). The difference between Pav and Par is that $P_{av}$ runs on videos recorded at a constant fps of 20, whereas in real time deployment a buffer mechanism is provided to form a temporary queue such that the system runs on a frame rate that it can achieve dynamically based on the speed of the detector. In this example, a counting accuracy $P_a$ is estimated in accordance with the following relationship:

$$P_a = \frac{In_{sys} + Out_{sys}}{In_{true} + Out_{true}} \quad \text{Equation (4)}$$

Where: $In_{true}$ and $Out_{true}$ is the actual number of people going in and out; and $In_{sys}$ and $Out_{sys}$ is the count given by the system.

The variations of the accuracies with crop factor are shown in the graphical representation 600. As can be seen, initially the classification Accuracy Ca does not change much with increase in crop factor (C) but with further increase in C, the classification accuracy reduces. This is due to loss of distinct shape features causing loss of trained model generality. Further, detection accuracy increases with increase in crop factor. This is because of the improved performance of the detector in cases where multiple people appear side by side and there is limited overlap of detection rectangles and hence not lost during NMS. However, as can be seen, the detection precision drops with increase in the crop factor due to the increase in false positives in lower scales. It should be noted that the counting accuracies $P_{av}$ and $P_{ar}$ initially increase with crop factor, but excess cropping may lead to a decrease in counting Accuracy. As will be appreciated by one skilled in the art, to use the detector for an application that involves tracking an optimal crop factor is required.

Further, as can be seen, $P_{av}$ varies in a similar pattern, but $P_{ar}$ is relatively better because while evaluating Par, the system is able run on a higher frame rate (close to about 40 fps) that resulted in a better tracking accuracy which further improved the counting.

FIG. 7 is a graphical representation 700 of accuracies with respect to the resize factor (S). As can be seen, $C_a$ and $D_a$ decrease because with increase in S, there is lack of sufficient features for correct classification. Here, the resize factor acts as an optimization for processing time that in-turn results in an improved frame rate. For evaluation of improvement in computation requirement with resize factor, the classifier was run on a Raspberry Pi 3B platform in single threaded form and the time taken by the classifier was measured.

Table 1 shows the time taken by the classifier with respect to the scale factor.

TABLE 1

| Scale Factor | Time taken for 100 samples (in milli sec) |
| --- | --- |
| 1/2 | 11.286 |
| 1 | 3.44 |
| 3/2 | 1.7 |
| 2 | 0.922 |
| 3 | 0.478 |
| 4 | 0.321 |
| 6 | 0.29 |

It should be noted that even though $C_a$ and $D_a$ decrease with S, the $P_{ar}$ increases initially but reduces later. This is owing to decrease in computation time required for detection, the system is able to work on a higher frame rate which in-turn improved tracking resulting in better counting. But a further increase in S made the classification accuracy to drop, which further decreased the $P_{ar}$. Moreover, the resize-factor did not improve $P_{av}$ because the frame rate is fixed. Table 2 shows the variation of accuracy with respect to the hard negative mining.

TABLE 2

| | Without Hard Negative Mining | With Hard Negative Mining |
| --- | --- | --- |
| $C_a$ | 0.89 | 0.95 |
| $D_a$ Recall | 0.9 | 0.945 |
| $D_a$ Precision | 0.87 | 0.9 |

TABLE 2-continued

| | Without Hard Negative Mining | With Hard Negative Mining |
|---|---|---|
| $P_{av}$ | 0.87 | 0.930 |
| $P_{ar}$ | 0.91 | 0.96 |

As can be seen, the impact of iterative hard negative mining can be seen on the accuracies. Here, a few negative background images of the scene were added in which the system was deployed along with a lot of background images. The improvement was reflected as a reduction in number of false positives which improved all accuracies.

The modules of the people detection system 100 described herein are implemented in computing devices. One example of a computing device 1100 is described below in FIG. 11. The computing device includes one or more processor 1102, one or more computer-readable RAMs 1104 and one or more computer-readable ROMs 1106 on one or more buses 1108. Further, computing device 1100 includes a tangible storage device 1110 that may be used to execute operating systems 1120 and the people detection system 102. The various modules of the people detection system 102 including a processor 110, a memory 112, an output module 120 and a detector module 122, may be stored in tangible storage device 1110. Both, the operating system 1120 and the system 102 are executed by processor 1102 via one or more respective RAMs 1104 (which typically include cache memory). The execution of the operating system 1120 and/or the system 102 by the processor 1102, configures the processor 1102 as a special purpose processor configured to carry out the functionalities of the operation system 1120 and/or the people detection system 102, as described above.

Examples of storage devices 1110 include semiconductor storage devices such as ROM 1106, EPROM, flash memory or any other computer-readable tangible storage device that may store a computer program and digital information.

Computing device also includes a R/W drive or interface 1114 to read from and write to one or more portable computer-readable tangible storage devices 1128 such as a CD-ROM, DVD, memory stick or semiconductor storage device. Further, network adapters or interfaces 1112 such as a TCP/IP adapter cards, wireless Wi-Fi interface cards, or 3G or 4G wireless interface cards or other wired or wireless communication links are also included in computing device.

In one example embodiment, the people detection system 102 which includes a processor 110, a memory 112, an output module 120 and a detector module 122, may be stored in tangible storage device 1110 and may be downloaded from an external computer via a network (for example, the Internet, a local area network or other, wide area network) and network adapter or interface 1112.

Computing device further includes device drivers 1116 to interface with input and output devices. The input and output devices may include a computer display monitor 1118, a keyboard 1124, a keypad, a touch screen, a computer mouse 1126, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A people detection system with feature space enhancement, the system comprising:
a memory having computer-readable instructions stored therein;
a processor configured to:
access a plurality of video frames captured using one or more overhead video cameras installed in a space;
extract one or more raw images of the space from the plurality of video frames;
process the one or more raw images to generate a plurality of positive image samples and a plurality of negative image samples, wherein the positive image samples comprise images having one or more persons present within the space and the negative image samples comprise images without the persons;
apply at least one of a crop factor or a resize factor to the positive and the negative image samples to generate curated positive and negative image samples;
detect one or more persons present in the space using a detection model trained by the curated positive and negative image samples, wherein the detection model comprises a plurality of classifiers;
iteratively train the detection model using feature vectors corresponding to the curated positive and negative image samples;
perform negative sample mining using a partially trained detection model; and
adjust the crop factor or resize factor.

2. The people detection system of claim 1, wherein the processor is further configured to execute the computer-readable instructions to:
annotate the raw images to identify one or more persons in the raw images;
extract annotated portions of the raw images and rotate the extracted annotated portions at a plurality of rotation angles to generate rotated image samples; and
combine the rotated image samples with a plurality of backgrounds to generate the plurality of positive image samples.

3. The people detection system of claim 2, wherein the processor is further configured to execute the computer-readable instructions to utilize pyramid blending for generating the positive image samples, wherein pyramid blending substantially minimizes effects of boundary artifacts.

4. The people detection system of claim 1, wherein the processor is further configured to execute the computer-readable instructions to:
generate a plurality of sub-images using the negative image samples; and
select sub-images from the plurality of sub-images having a resolution substantially similar to resolution of the positive image samples.

5. The people detection system of claim 1, wherein the processor is further configured to execute the computer-readable instructions to:
extract a plurality of channel features using the positive and negative image samples; and
determine the feature vectors using the extracted channel features.

6. The people detection system of claim 1, wherein the plurality of classifiers of the detection model comprise an AdaBoost classifier for classification and detection of one or more persons present in the space.

7. The people detection system of claim 6, wherein the processor is further configured to execute the computer-readable instructions to utilize a set of weak classifiers to separate the negative image samples based on a pre-determined set of boundaries.

8. The people detection system of claim 1, wherein the processor is further configured to execute the computer-readable instructions to:
determine the crop factor to prevent detection of two persons present in close proximity as one person; and
crop the image samples in accordance with the crop factor.

9. The people detection system of claim 8, wherein the processor is further configured to execute the computer-readable instructions to select the crop factor to remove portions corresponding to shoulders of the two persons present in close proximity.

10. The people detection system of claim 1, wherein the processor is further configured to execute the computer-readable instructions to determine the resize factor to obtain a desired detection accuracy at a pre-determined frame rate.

11. The people detection system of claim 1, wherein the processor is further configured to execute the computer-readable instructions to detect location and size of the detected persons present in the space.

12. A people detection system with feature space enhancement, the system comprising:
a plurality of overhead video cameras installed within a space, each of the plurality of overhead video cameras configured to capture real-time video of the space;
a detector communicatively coupled to the plurality of overhead video cameras and configured to detect one or more persons present in the space, wherein the detector comprises:
an image processing module configured to process video frames of the captured video to generate a plurality of positive image samples and a plurality of negative image samples, wherein the positive image samples comprise images having one or more persons present within the space and the negative image samples comprise images without the persons;

a feature space estimation module configured to determine one or more feature space parameters, wherein the feature space parameters comprise a crop factor, a resize factor, or combinations thereof; and a detector module configured to:
  apply the one or more feature space parameters to the positive and the negative image samples to generate curated positive and negative image samples;
  detect one or more persons present in the space using a detection model trained by the curated positive and negative image samples, wherein the detection model comprises a plurality of classifiers;
  iteratively train the detection model using feature vectors corresponding to the curated positive and negative image samples;
  perform negative sample mining using a partially trained detection model; and
  adjust the crop factor or resize factor.

13. The people detection system of claim 12, wherein the image processing module is further configured to:
  extract raw images from the video frames;
  annotate the raw images to identify one or more persons in the raw images;
  extract annotated portions of the raw images and rotate the extracted annotated portions at a plurality of rotation angles to generate rotated image samples; and
  combine the rotated image samples with a plurality of backgrounds to generate the plurality of positive image samples.

14. The people detection system of claim 12, wherein the plurality of classifiers of the detection model comprise AdaBoost classifier for classification and detection of one or more persons in the space.

15. The people detection system of claim 14, wherein the detection model is further configured to estimate a detection accuracy and a classification accuracy of the detection model.

16. A computer-implemented method for detecting persons in a space, the method comprising:
  accessing a plurality of video frames captured using one or more overhead video cameras installed in a space;
  extracting one or more raw images of the space from the plurality of video frames;
  processing the one or more raw images to generate a plurality of positive image samples and a plurality of negative image samples, wherein the positive image samples comprise images having one or more persons present within the space and the negative image samples comprise images without the persons;
  applying at least one of a crop factor or a resize factor to the positive and the negative image samples to generate curated positive and negative image samples;
  detecting one or more persons present in the space using the curated positive and negative image samples;
  iteratively training a detection model using the curated positive and negative image samples, wherein the detection model comprises a plurality of classifiers;
  performing negative sample mining using a partially trained detection model; and
  adjusting the crop factor or resize factor.

17. The computer implemented method of claim 16, further comprising tracking number of persons entering or exiting the space using Kalman correction and Hungarian Assignment solver.

18. A people detection system with feature space enhancement, the system comprising:
  a memory having computer-readable instructions stored therein;
  a processor configured to:
    access a plurality of video frames captured using one or more overhead video cameras installed in a space;
    extract one or more raw images of the space from the plurality of video frames;
    process the one or more raw images to generate a plurality of positive image samples and a plurality of negative image samples, wherein the positive image samples comprise images having one or more persons present within the space and the negative image samples comprise images without the persons;
    determine a crop factor to prevent detection of two persons present in close proximity as one person;
    apply the crop factor to the positive and the negative image samples to generate curated positive and negative image samples; and
    detect one or more persons present in the space using a detection model trained by the curated positive and negative image samples.

19. A computer-implemented method for detecting persons in a space, the method comprising:
  accessing a plurality of video frames captured using one or more overhead video cameras installed in a space;
  extracting one or more raw images of the space from the plurality of video frames;
  processing the one or more raw images to generate a plurality of positive image samples and a plurality of negative image samples, wherein the positive image samples comprise images having one or more persons present within the space and the negative image samples comprise images without the persons;
  applying at least one of a crop factor or a resize factor to the positive and the negative image samples to generate curated positive and negative image samples;
  detecting one or more persons present in the space using the curated positive and negative image samples; and
  tracking number of persons entering or exiting the space using Kalman correction and Hungarian Assignment solver.

* * * * *